Oct. 24, 1961          W. HÜTTER          3,005,230
PLANT FOR THE FABRICATION OF CHIPBOARDS OR SIMILAR CONSTRUCTION
MATERIALS BY MEANS OF AN INTERMITTENT WORKING
SINGLE STORY PRESS
Filed Feb. 8, 1961
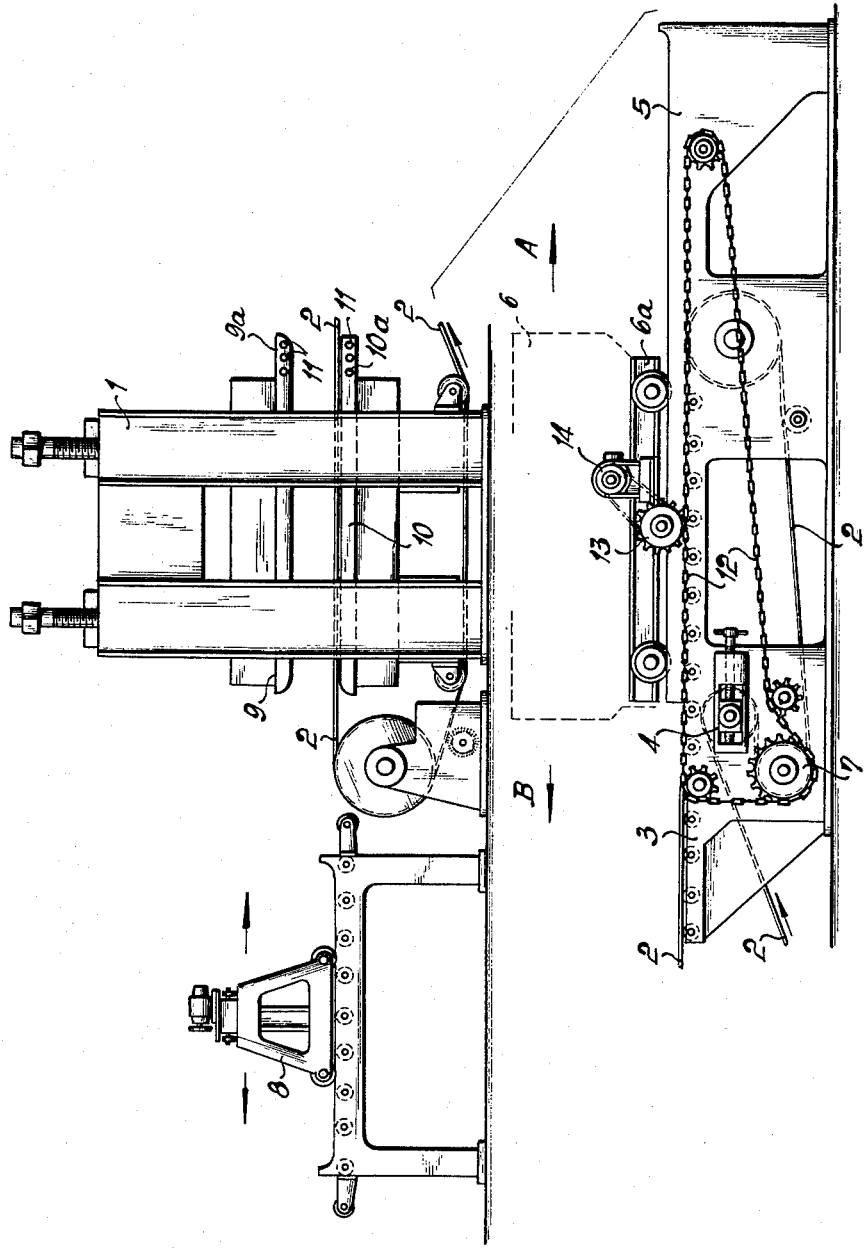
INVENTOR
Will HÜTTER
by
Jacob L. Kollin,
ATTORNEY

United States Patent Office

3,005,230
Patented Oct. 24, 1961

3,005,230
PLANT FOR THE FABRICATION OF CHIPBOARDS OR SIMILAR CONSTRUCTION MATERIALS BY MEANS OF AN INTERMITTENT WORKING SINGLE STORY PRESS
Will Hütter, Krefeld, Germany, assignor to Niederrheinische Maschinenfabrik, Becker & van Hullen, Krefeld, Germany
Filed Feb. 8, 1961, Ser. No. 87,944
6 Claims. (Cl. 18—4)

The present invention relates to a plant for the fabrication of chipboards or similar construction materials by means of an intermittent working single story press through which passes an endless conveyor belt, said belt being charged with chip stock from a charging station.

During the actual pressing operation the said endless conveyor belt must be at a standstill and hence must be provided with a feed equal to the desired chipboard length while the press is in open position.

In prior art installations using a stationary charging station it has been possible to laminate the belt with chip stock during the duration of one feed motion only. Thus, when it was desired to keep the press opening time to the most practicable minimum, therefore requiring a corresponding increase in the speed of the conveyor belt, then the duration of each individual feed motion would become comparatively short. This resulted in considerable difficulties in obtaining uniform distribution of the chip stock on the conveyor belt at the stationary charging station. If in contrast thereto the conveyor belt was made to move but slowly for the purpose of obtaining uniform distribution of the chip stock on the conveyor belt, then the single story press opening time which is a mere non-operative period, was in equal proportion, thus affecting adversely the press operation throughout.

Prior proposals made in connection with plants for the fabrication of chipboards or similar construction materials, provided for charging the press by means of a flatcar which would move to and fro between the press unit and the charging station and which would be charged with laminate chip stock. According to these proposals, the charging station would be arranged for travelling in the path of the flatcar's travel, with the flatcar, however, remaining at a standstill during the laminating process. Upon completing of the charging and/or laminating, the flatcar would be moved to the press, emptied into the press unit and returned to the charging station, which would in the meantime return to the original position it had attained at the initiation of the laminating process. One complete working cycle of the flatcar from one charging operation to the next would take so long and require such an extended press open-time that this known proposal failed to materialize in practice.

It is an object of the present invention to eliminate the disadvantageous interdependence existing heretofore between the belt laminating time and belt speed of travel in a plant using an endless conveyor belt passing through an intermittent working single story press.

Another object of the invention is to provide a plant in which the endless conveyor belt can be given the highest possible speed of travel while allowing sufficient time for the chip stock to be uniformly spread on the belt the full predetermined length of a finished chipboard, as desired, in each operation.

The solution of this problem according to the present invention is substantially arrived at by having the charging station movably arranged in a known manner in the direction of travel of the conveyor belt and in such kinematic connection with the conveyor belt that as long as the conveyor belt is advancing, the charging station remains behind the running conveyor belt in the direction of the press by the very adjustable relative speed with which it would move in a reverse sense, away from the press unit if the conveyor were at a standstill. Such kinematic connection should be established preferably by provision of variable speed, driven, gearwheels at the charging station carriage, said gearwheels engaging with chains which revolve at the same speed and in the same direction as the endless conveyor, and which tends to shift the charging station off towards the single story press. While the conveyor belt and hence the chains are at a standstill, the charging station moves relative to the belt conveyor, said relative movement being dependent on the speed of the driven gearwheels. This relative movement between the charging station and the belt conveyor is maintained while the conveyor belt and the chains revolve in cooperation therewith, making an advance movement in the direction towards the single story press.

With the plant according to the invention, there is thus available for charging and/or laminating the endless belt conveyor with chip stock in uniform distribution over a desired length of a chipboard one full working cycle of the single story press, which is composed of the advance time of the belt conveyor and actual molding time. Even if either time factor, as selected, were to be as slight as necessary with consideration to the belt conveyor drive on the one hand, and to the press closing and opening periods on the other, the resulting total time would still be such as to be adequate for careful and uniform distribution of the chip stock on the endless belt conveyor.

The above and other objects of the invention will become apparent from the following description and the accompanying drawing, illustrating a preferred embodiment of the invention.

The single figure of the drawing illustrates schematically the plant according to the invention.

In the figure, an endless belt conveyor 2 is arranged to pass through a heated, intermittent working type press 1 for the fabrication of chipboards or similar construction materials. Before reaching press unit 1, the belt conveyor 2 is run over a roller table 3 disposed in the supporting framework on which there is also provided a belt-stretching device 4, of conventional design, for belt conveyor 2.

There are further secured to the roller table 3 and at both sides of belt conveyor 2, runway rails 5 to receive the carriage 6a of a charging station 6, shown in phantom. Drive 7 of conveyor belt 2 is so controlled, in conventional manner, as to automatically stop the conveyor belt during the time a working stroke is being performed by press 1, and so as to move it in the direction indicated by arrows, by a predetermined length of travel, as soon as the press opens after having completed a working stroke. While such advance motion is being made, conveyor belt 2 feeds to a cutting section 8 the portion of the stock which has been compressed to provide a chipboard within press unit 1.

The vertically reciprocable platen 9 of the press 1 and the stationary bed 10 thereof extend towards roller table 3 and are provided with built-in cooling coils 11 in the projections 9a and 10a. As platen 9 descends, the portion of the chip stock cake resting on belt 2 between the projections 9a and 10a of the dummy blocks is precompressed without heating.

A pair of chains 12 are arranged to travel across roller table 3 and over the driving roller 7 of conveyor belt 2 at either side thereof, said chain being adapted to come to a standstill simultaneously with the belt conveyor or for travelling at the same speed as the latter. Gearwheels 13 engage with the chains 12, these gearwheels being disposed on carriage 6a of the travelling type charging station 6 and arranged for rotation by a common variable speed drive 14. Gearwheels 13 tend to move the charging station 6, depending on the speed for which they are adjusted, at a specific relative speed with relation to the chains 12, and hence with relation to the belt conveyor 2 in the direction indicated by arrow A, away from press unit 1. During the time one advance motion is being made by the belt conveyor 2, chains 12, via gearwheels 13, carry charging station 6 along in the direction as indicated by arrow B, i.e. towards the press. During this advance, too, the charging station moves along in relation to conveyor belt 2 at a predetermined speed in the direction indicated by arrow A.

Belt conveyor 2 may be of conventional design and made of rubber or textile fabric or wire cloth or it may be a plate belt. Neither is there any objection to connecting chains 12 with the belt conveyor 2 and to passing both these components together through press 1 and a common driving and idling roller forming part of the conveyor. In general, however, the arrangement as described in the foregoing description is more advantageous, because it permits the conveyor belt 2 to be tightened up independently from chains 12 and for the chains as such to be kept substantially shorter.

In another embodiment, the chains 12 may be dispensed with entirely and gearwheels 13 may be designed as frictional rollers which act upon conveyor belt 2 direct. This solution, however, is recommended only if a conveyor belt having high wearing resistance properties is used. Care must be taken also in such an instance to make certain that there is no slip between the belt and the friction rollers when the conveyor belt is being advanced. If this precaution is properly considered, it is possible in both instances to adjust accurately the relative movement of charging station 6 in relation to conveyor belt in the direction of arrow A and hence the layer thickness of the chip stock as charged on the belt, by an appropriate regulation of drive 14.

What I claim and desire to protect by Letters Patent of the United States is:

1. In a plant for the fabrication, by molding, of chipboards or similar construction materials, in combination, an intermittently operating single story press whose cycle comprises a molding work stroke and idle stroke, an endless traveling conveyor belt for feeding chip stock to said press, means for driving said conveyor, a charging station disposed above said conveyor for charging the conveyor with chip stock, a carriage for said charging station, means operably connecting said conveyor belt and said carriage for propelling the carriage in a direction away from said press during its idle stroke, means for continuously advancing said charging station a predetermined distance towards the pressure during its complete cycle and for depositing a desired length of chip stock on said conveyor, and control means for interrupting the conveyor belt's travel during the working stroke of the press and for resuming its movement during its idle stroke.

2. In a plant for the fabrication, by molding, of chipboards or similar construction materials, in combination, an intermittently operating single story press whose cycle comprises a molding work stroke and idle stroke, a support frame adjacent said press, a rail bed mounted on said frame and directed towards said press, a carriage slidable on said bed, a charging station displaceable on said carriage longitudinally of said bed, an endless traveling conveyor belt for feeding chip stock to said press, disposed below said charging station, an endless movable chain in said frame, means in said frame for driving said chain and said belt, gearing operatively connecting said chain and said carriage away from said press and a variable speed drive on said carriage operatively connecting said charging station and said gearing for continuously advancing said charging station a predetermined distance towards the pressure during its complete cycle and for depositing a desired length of chip stock on said conveyor, and control means for interrupting the conveyor belt's travel during the working stroke of the press and for resuming its movement during its idle stroke.

3. In a plant for the fabrication, by molding, of chipboards or similar construction materials, in combination, an intermittently operating single story press whose cycle comprises a molding work stroke and idle stroke, an endless traveling conveyor belt extending through said press for feeding chip stock to said press, means for driving said conveyor, a charging station disposed above said conveyor for charging the conveyor with chip stock, a carriage for said charging station, means operably connecting said conveyor belt and said carriage for propelling the carriage in a direction away from said press during its idle stroke, means for continuously advancing said charging station a predetermined distance towards the press during its complete cycle and for depositing a desired length of chip stock on said conveyor and control means for interrupting the conveyor belt's travel during the working stroke of the press and for resuming its movement during its idle stroke.

4. In a plant for the fabrication, by molding, of chipboards or similar construction materials, in combination, an intermittently operating single story press whose cycle comprises a molding work stroke and an idle stroke, a support frame adjacent said press, a rail bed mounted on said frame and directed towards said press, a carriage slidable on said bed, a charging station displaceable on said carriage longitudinally of said bed, an endless traveling conveyor belt for feeding chip stock to said press, disposed below said charging station, an endless movable chain in said frame, means in said frame for driving said chain and said belt, gearing operatively connecting said chain and said carriage away from said press and a variable speed drive on said carriage operatively connecting said charging station and said gearing for continuously advancing said charging station a predetermined distance towards the press during its complete cycle and for depositing a desired length of chip stock on said conveyor, control means for interrupting the conveyor belt's travel during the working stroke of the press and for resuming its movement during its idle stroke and means for heating said press, said press having a vertically reciprocable platen and a stationary bed formed with cooled extensions on its one end directed towards said support frame for pre-compressing the chip stock.

5. In a plant for the fabrication, by molding, of chipboards or similar construction materials, in combination, an intermittently operating single story press whose cycle comprises a molding work stroke and an idle stroke, a support frame adjacent said press, a rail bed mounted on said frame and directed towards said press, a carriage slidable on said bed, a charging station displaceable on said carriage longitudinally of said bed, an endless traveling conveyor belt for feeding chip stock to said press, disposed below said charging station, an endless movable chain in said frame, means in said frame for driving said chain and said belt, gearing operatively connecting said chain and said carriage away from said press and a variable speed drive on said carriage operatively connecting said charging station and said gearing for continuously advancing said charging station a predetermined distance towards the press during its complete cycle and for depositing a desired length of chip stock on said conveyor, control means for interrupting the conveyor belt's travel during the working stroke of the press and for resuming its movement during its idle stroke and means for heating said press, said press having a vertically reciprocable platen and a stationary bed formed with cooled extensions on its one end directed towards said support frame for pre-compressing the chip stock and a cutting station adjacent the other end of the press for cutting chipboard delivered by the press.

6. In a plant for the fabrication, by molding, of chipboard or similar construction materials, in combination, an intermittently operating single story press whose cycle comprises a molding work stroke and an idle stroke, a support frame adjacent said press, a rail bed mounted on said frame and directed towards said press, a carriage slidable on said bed, a charging station displaceable on said carriage longitudinally of said bed, an endless traveling conveyor belt for feeding chip stock to said press, disposed below said charging station, an endless movable chain in said frame, means in said frame for driving said chain and said belt, gearing operatively connecting said chain and said carriage away from said press and a variable speed means for maintaining the charging station in such kinematic connection with said chain and conveyor belt that it stays back behind the traveling conveyor belt in the direction of the press by a distance determined by the relative speed at which it would move in reverse sense away from its press if the conveyor belt were at a standstill, and control means for interrupting the conveyor belt's travel during the working stroke of the press and for resuming its movement during its idle stroke.

References Cited in the file of this patent

UNITED STATES PATENTS

| | | |
|---|---|---|
| 1,905,975 | Thomas | Apr. 25, 1933 |
| 2,320,728 | Hume | June 1, 1943 |
| 2,696,330 | Fahrni | Dec. 7, 1954 |
| 2,960,722 | Freeman | Nov. 22, 1960 |

FOREIGN PATENTS

| | | |
|---|---|---|
| 100,231 | Germany | Dec. 10, 1898 |